T. DANQUARD.
EXPRESSION DEVICE FOR AUTOMATIC MUSICAL INSTRUMENTS.
APPLICATION FILED NOV. 6, 1916. RENEWED JULY 19, 1921.
1,413,831.
Patented Apr. 25, 1922.
5 SHEETS—SHEET 2.
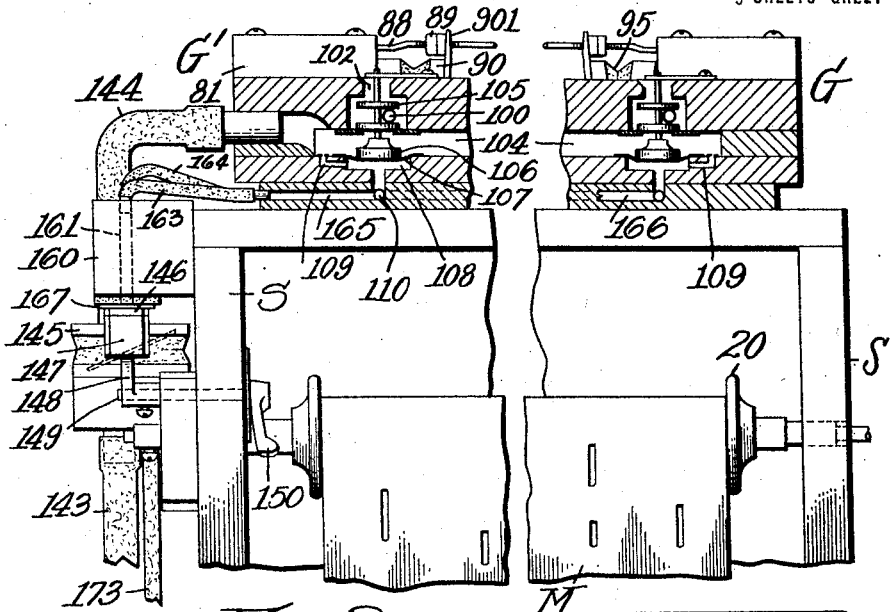
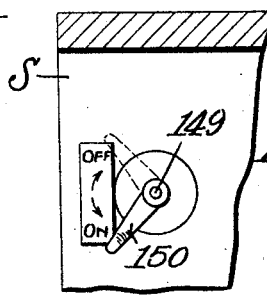
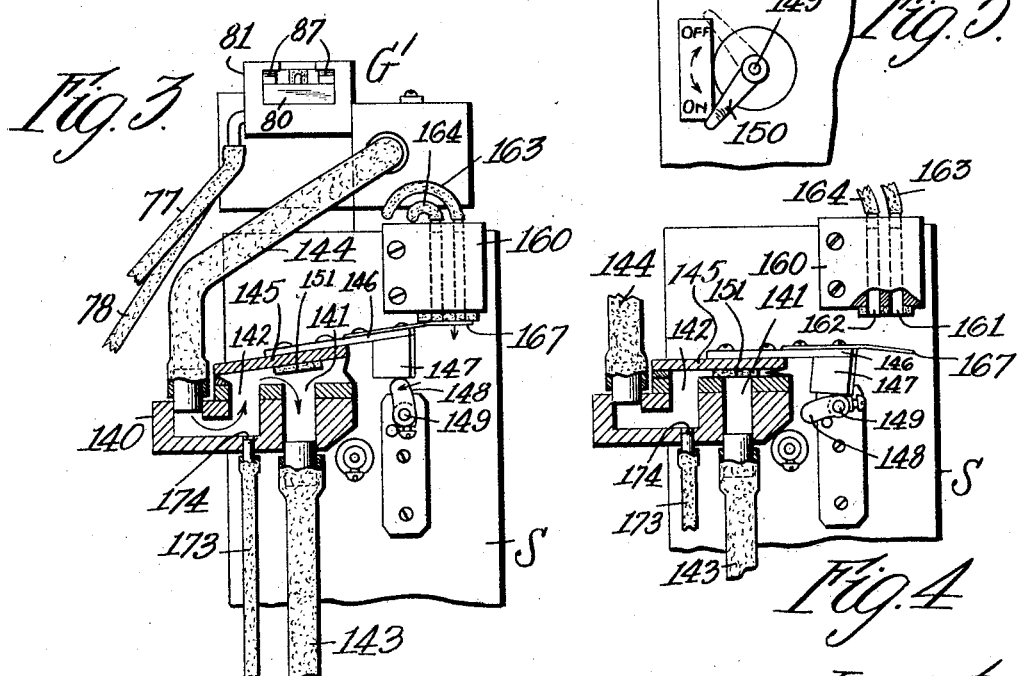
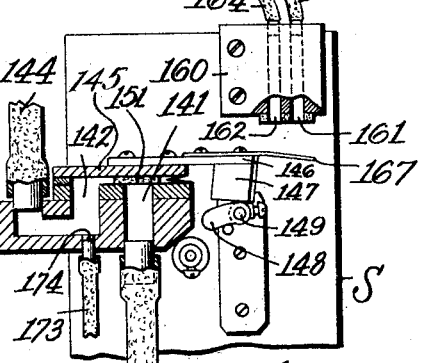

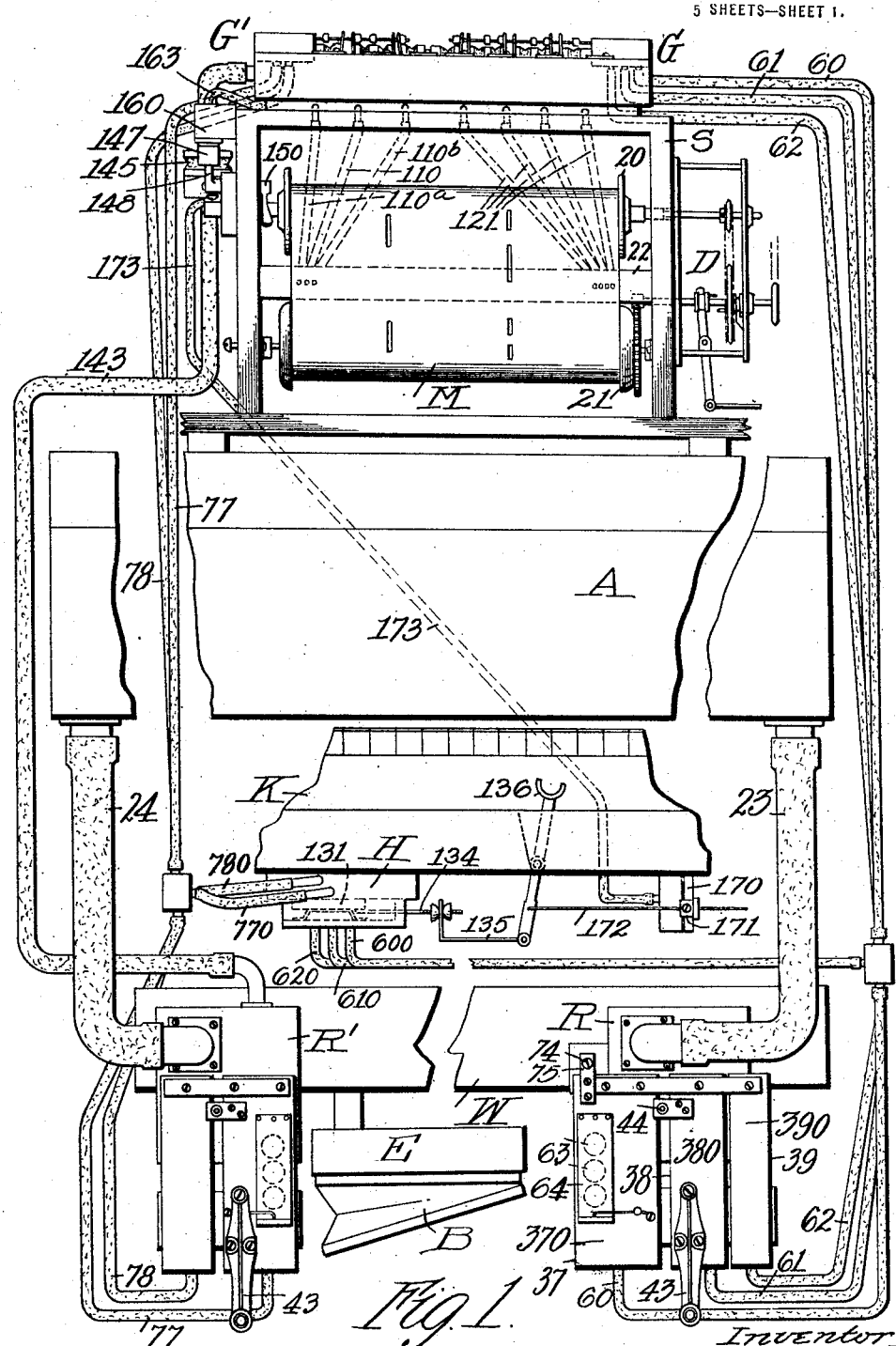

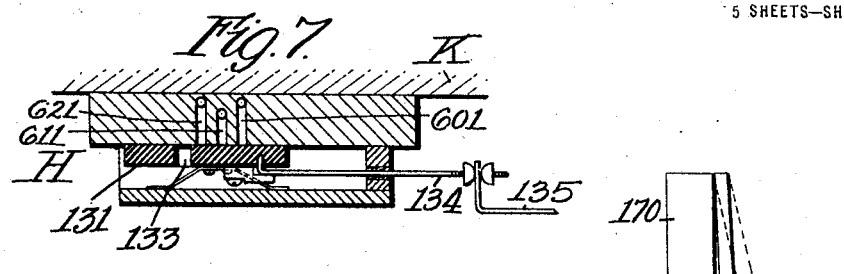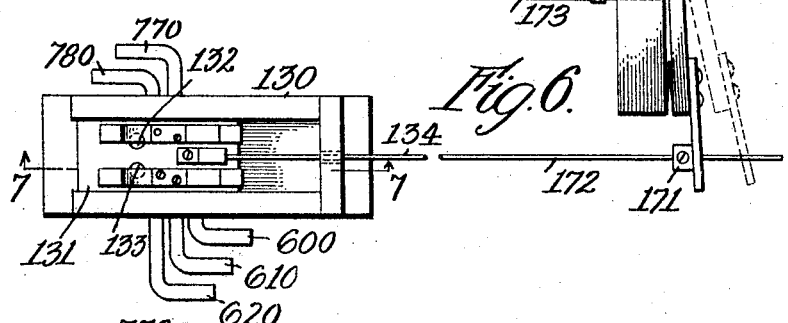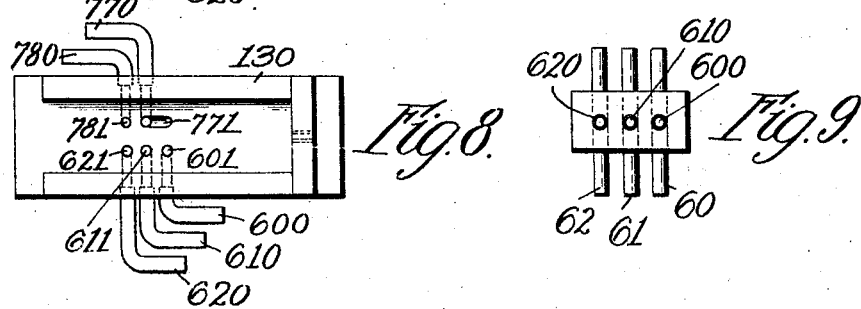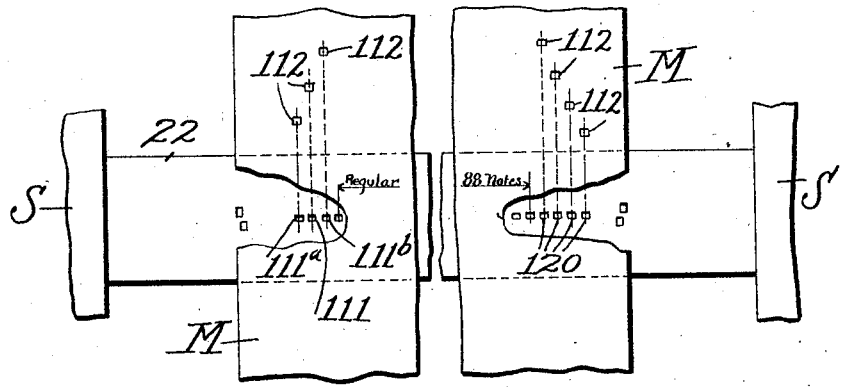

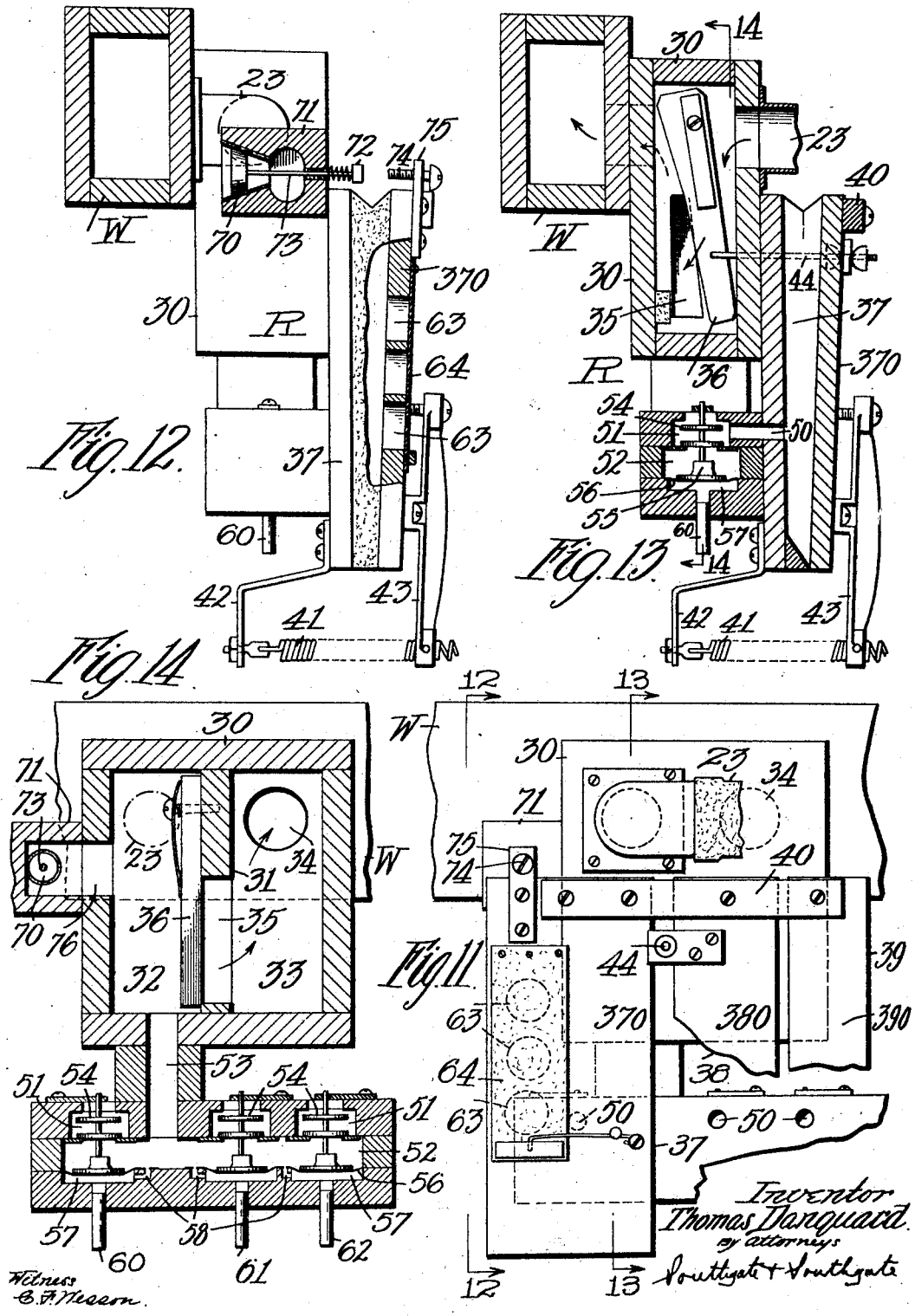

T. DANQUARD.
EXPRESSION DEVICE FOR AUTOMATIC MUSICAL INSTRUMENTS.
APPLICATION FILED NOV. 6, 1916. RENEWED JULY 19, 1921.
1,413,831.
Patented Apr. 25, 1922.
5 SHEETS—SHEET 5.
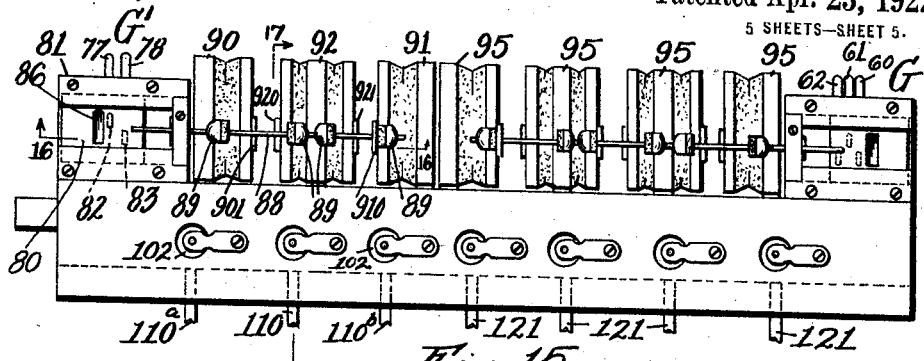
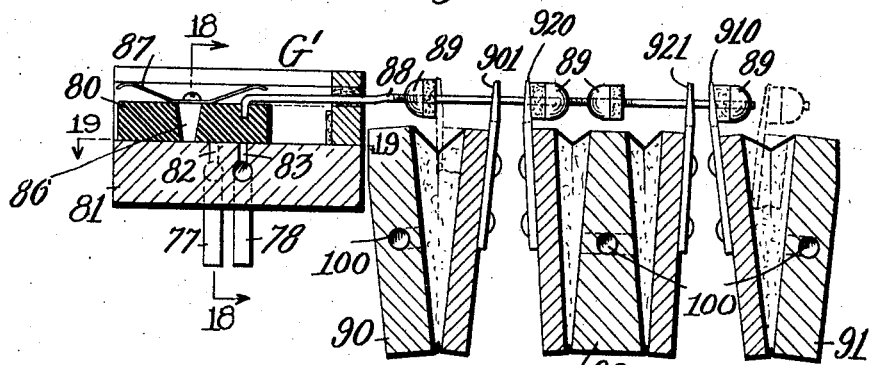
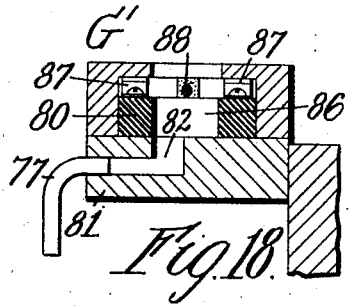
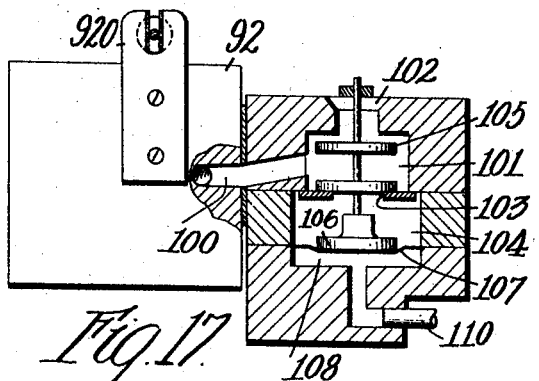
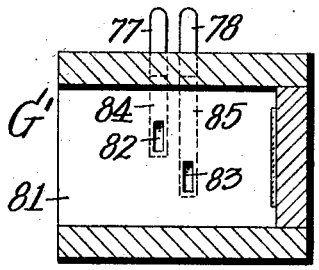
Inventor
Thomas Danquard
by attorneys
Southgate & Southgate
Witness
C. F. Mason

UNITED STATES PATENT OFFICE.

THOMAS DANQUARD, OF NEW YORK, N. Y., ASSIGNOR TO AUTO PNEUMATIC ACTION COMPANY, A CORPORATION OF NEW YORK.

EXPRESSION DEVICE FOR AUTOMATIC MUSICAL INSTRUMENTS.

1,413,831.     Specification of Letters Patent.      Patented Apr. 25, 1922.

Application filed November 6, 1916, Serial No. 129,701. Renewed July 19, 1921. Serial No. 485,848.

*To all whom it may concern:*

Be it known that I, THOMAS DANQUARD, a citizen of the United States, residing at New York, in the county of New York and State of New York, have invented a new and useful Expression Device for Automatic Musical Instruments, of which the following is a specification.

This invention relates to an expression device for automatic musical instruments, especially adapted to control the expression of pneumatically operated instruments, such as player pianos and organs.

In such instruments it is customary to indicate upon the perforated note sheet the intensity of tone to be employed in rendering different parts of the selection. Such indication may consist of lines or marks on the note sheet indicating the changes of pressure to be made manually as the sheet advances, or it may consist of special perforations in the note sheet by which the expression may be automatically controlled.

It is the general object of my invention to provide improved mechanism for automatically controlling the expression of a player piano or other automatic musical instrument, and also to facilitate alternate use of both manual and automatic control.

With this object in view one feature of my invention relates to the provision of a regulating device comprising a plurality of actuating pneumatics and to the further provision of selector mechanism so designed that any selected pneumatic may be rendered operative to position the regulating device, the remaining pneumatics being simultaneously rendered inoperative. I also provide means for controlling the regulating device manually, and a further feature of my invention relates to means for rendering either system of control operative and the other system of control simultaneously inoperative.

Another object of my invention is to improve the selector by which the regulating device is automatically controlled, simplifying the construction of the selector and rendering it more effective and reliable in operation.

Another feature of my invention relates to means for relieving the resistance to the pumping bellows when the pressure on the actions is reduced for extremely soft effects.

My invention further relates to certain arrangements and combinations of parts hereinafter described and more particularly pointed out in the appended claims.

A preferred form of my invention is shown in the drawings in which—

Fig. 1 is a front elevation of certain parts of a player piano mechanism cut away in parts to show additional mechanism;

Fig. 2 is an enlarged front elevation of a portion of the tracker or spool box and associated mechanism, the selector being shown in section above the box;

Fig. 3 is a left-hand side elevation, partly in section, of the cut-out device shown in Fig. 2;

Fig. 4 is a detail sectional elevation showing the cut-out device in a different position;

Fig. 5 is a side view of the hand lever which controls the cut-out device;

Fig. 6 is a front elevation of the sliding valve by which the expression mechanism is manually controlled and also shows the pneumatic by which the manual control mechanism is rendered inoperative when the automatic control is in use;

Fig. 7 is a sectional longitudinal view taken along the line 7—7 in Fig. 6;

Fig. 8 is a front view of the valve block with the valve removed;

Fig. 9 is a detail view of a connection to be described;

Fig. 10 is a front elevation of the tracker bar and note sheet;

Fig. 11 is a front elevation of the treble expression regulator;

Fig. 12 is a left-hand side elevation, partly in section, taken substantially along the line 12—12 in Fig. 11;

Fig. 13 is a sectional view taken along the line 13—13 in Fig. 11;

Fig. 14 is a sectional elevation taken along the line 14—14 in Fig. 13;

Fig. 15 is a top plan view of the selector mechanism;

Fig. 16 is an enlarged sectional elevation of the bass selector, taken along the line 16—16 in Fig. 15;

Fig. 17 is a transverse sectional view, taken along the line 17—17 in Fig. 15;

Fig. 18 is a transverse sectional elevation of the sliding selector valve and valve-block, taken along the line 18—18 in Fig. 16, and Fig. 19 is a sectional view of the valve block taken along the line 19—19 in Fig. 16.

Referring to Fig. 1, I have shown a tracker or spool box S within which a music sheet M is supported by a music roll 20 and a take-up roll 21 for travel over the usual tracker bar 22. Driving mechanism D of any usual type is provided for actuating the music and take-up rolls.

The action chest is indicated at A, and the main wind trunk at W, from which the air is exhausted through the usual storage and equalizing devices E by the usual pumping bellows B. As the air from the chest A is drawn into the wind trunk W it passes through tension regulating devices R and R' adapted to vary the tension in the treble and bass portions of the instrument respectively. These regulators may be controlled either manually or automatically.

For automatic control I provide treble and bass selectors G and G', shown herein as mounted on the spool box S, and for manual control I provide the hand-shifting mechanism H, shown herein as positioned below the key board K. The action chest A is connected to the regulators R and R' by exhaust pipes 23 and 24 respectively.

I will now describe the construction and operation of the treble tension regulator R. The regulator R (Figs. 11 to 14) comprises a casing 30 divided by a partition 31 into compartments 32 and 33. The compartment 32 is connected by the pipe 23 to the action chest A, and the compartment 33 is connected by a passage 34 with the wind trunk W. A passage 35 connects the compartments 32 and 33, and a pivotally-mounted spring-pressed valve 36 is provided by which the passage 35 may be closed to a greater or less extent to vary the air tension in the compartment 32.

For moving the swinging valve 36 a plurality of pneumatics 37, 38 and 39 (Fig. 11) are mounted on the casing 30, the movable outer leaves 370, 380 and 390 of these pneumatics being joined together by a strip 40 so that they will all move together whenever any one of the pneumatics is rendered operative. The pneumatics are normally held open or in the position shown in Fig. 13 by a spring 41 connected at one end to a fixed arm 42 and at the other end to an arm 43 adjustably secured to the movable leaf 380 of the pneumatic 38. The leaf 380 is also connected by an adjustable link 44 to the swinging valve 36.

From the description thus far given, it will be evident that whenever any one of the pneumatics 37, 38 or 39 is deflated the movable leaves of the pneumatics will be swung inward against the tension of the spring 41, thereby partially closing the passage 35. As the pneumatics differ in size the effect on the valve will vary according to which pneumatic becomes operative.

When all of the pneumatics are inoperative the passage 35 will be fully open and the actions will be operated with the full tension of the wind trunk, thus producing a very loud or fortissimo effect. If the smallest pneumatic 39 becomes operative the tension will be somewhat reduced by the partial closing of the valve 36, producing a loud or forte effect. If the pneumatic 38 instead of the pneumatic 39 becomes operative a soft or piano effect will be produced, and the pneumatic 37 will produce the softest or pianissimo effect.

The selector G controls the pneumatics 37, 38 or 39 and is so constructed that any one of the pneumatics 37, 38 or 39 may be rendered operative while the other two pneumatics remain inoperative. In Fig. 13 I have shown the air valve through which the selector G controls the pneumatic 37.

The pneumatic 37 is connected by a passage 50 to a chamber 51 open on one side to the atmosphere and on the other side to an exhaust chamber 52 connected by a passage 53 (Fig. 14) with the compartment 32 in the casing 30. The chamber 51 contains a double air valve 54 adapted to open the chamber 51 and passage 50 to the exhaust chamber 53 or to the atmosphere, according to its position. The valve 54 has a head 55 positioned for engagement by a diaphragm 56 overlying a small chamber 57 connected by a bleed opening 58 with the exhaust chamber 52. The chamber 57 is also connected by a tube 60 with the selector G by which it is closed or opened to the atmosphere. When the tube 60 is open, atmospheric pressure raises the diaphragm 56, which engages the head 55 of the valve 54 and lifts the valve, thus connecting the chamber 51 with the exhaust passage 52, and thereby exhausting the pneumatic 37. Deflation of this pneumatic moves the valve 36 to partially close the passage 35. Additional tubes 61 and 62 extend from the selector G to the regulator R and control the pneumatics 38 and 39 through air valves precisely similar to the one just described.

The largest pneumatic 37 is provided with air vents 63 (Fig. 12) covered by a flap valve 64 for relieving the pressure in the pneumatic when one of the pneumatics 38 or 39 is operative. Such relief ports are not found necessary in the smaller pneumatics from which the air escapes with sufficient rapidity through the atmospheric ports of the air valves.

When the pneumatic 37 is operated to close the passage 35 to its greatest extent the air supply of the pumping bellows of the instrument is almost entirely shut off and the resistance or drag on the bellows action is correspondingly great. This sudden increase in resistance is unpleasant for the person operating the bellows and to remedy this objectionable feature I have provided a relief valve 70 (Fig. 12) for relieving the air tension of the pumping bellows. This valve 70 is shown herein as of conical form and mounted in a valve casing 71 secured to the regulator casing 30. A head 72 on the valve stem 73 is positioned for engagement by a screw 74 adjustable in an arm 75 secured to the movable leaf 370 of the pneumatic 37. The casing 71 is connected by a cross passage 76 to the compartment 32 of the regulator casing 30.

When the pneumatic 37 is exhausted and the movable leaf 370 thereof approaches its extreme inner position, the screw 74 engages the head 72 of the valve 70, depressing the valve, and thus opening the passage 76 to the atmosphere. The opening of this passage will tend to further decrease the air tension in the chamber 32. Since, however, the pneumatic 37 is deflated by the exhaust tension in the chamber 32, communicated through the passage 50 and exhaust chamber 52, this decrease in tension will permit the spring 41 to open the pneumatic to a certain extent, thus moving the valve 36 and permitting more air to pass through the passage 35 to the wind trunk. The drag on the bellows is thus relieved and by adjustment of the screw 74 any desired final tension may be secured.

The construction of the tension regulator R' is precisely similar to the construction of the regulator R with the exception that the regulator R' is provided with two pneumatics only, thus giving three gradations of pressure instead of four. The pneumatics of the regulator R' are controlled by tubes 77 and 78 extending to the selector G'.

I will now describe the selectors by which the regulators are automatically controlled. Each selector consists briefly of a sliding valve, adapted to control the admission of air to the air valves of the regulator pneumatics, and a plurality of pneumatics for moving the sliding valve.

The selector G' for the regulator R' is shown in detail in Figs. 16 to 19, in which the sliding valve 80 is mounted to slide in a valve block 81 having apertures 82 and 83 in its valve seat. These apertures are connected by cross passages 84 and 85 to the tubes 77 and 78 which control the regulator R'. The valve 80 has a single port or air opening 86 formed therein which is adapted to be registered with either of the apertures 82 or 83. The valve is pressed against its valve seat by a spring 87 and is moved longitudinally by means of a valve rod 88 having a plurality of collars 89 adjustably secured thereto. The longitudinal position of the rod and valve is controlled by single-acting pneumatics 90 and 91 and a double-acting pneumatic 92.

The movable leaf of the pneumatic 90 is provided with a projection 901 adapted to engage one of the collars 89 and move the rod and valve to its extreme left-hand or inoperative position. The pneumatic 91 has a projection 910 which also engages a collar 89 on the rod 88 and is effective to move the valve to its extreme right-hand position in which the port 86 coincides with the aperture 83, thus admitting air into the tube 77 and thereby causing deflation of the regulator R' to its greatest extent. The pneumatic 92 is a double-acting pneumatic and is provided with projections 920 and 921 which engage adjacent collars 89 upon the rod 88 and move the rod and valve to an intermediate position in which the port 86 uncovers the tube 78, causing less deflation of the regulator R'.

With this arrangement of pneumatics it will be seen that any one of the pneumatics can at any time engage and position the valve rod and valve at a predetermined point regardless of the position which the rod and valve previously occupied. The treble selector G is exactly similar in construction, with a plurality of pneumatics 95 including one additional double-acting pneumatic, thus giving two intermediate positions instead of one.

The mechanism for controlling the different pneumatics in both selectors is identical and in Fig. 17 I have shown the control mechanism for the pneumatic 92, the mechanism being substantially a duplicate of the air valve shown in Fig. 13 for controlling the regulator pneumatic 37.

A passage 100 (Fig. 17) leads from the pneumatic 92 to a chamber 101 having a port 102 open to the atmosphere and a second port 103 leading to an exhaust chamber 104 indirectly connected to the wind trunk W, as will be hereinafter described. A double valve 105 is positioned in the chamber 101 and its valve head 106 is positioned for engagement by a diaphragm 107 overlying a chamber 108 having a bleed opening 109 and also connected to a tube 110. The tube 110 connects with a special opening 111 (Fig. 10) in the tracker bar 22. When the opening 111 is closed by the music sheet the chamber 108 will be exhausted through the bleed opening 109 and the valve 105 will remain in the position shown in Fig. 17, thus connecting the pneumatic 92 to the atmosphere.

Special perforations 112 are provided in the perforated note sheet for controlling the expression. If the opening 111 is uncovered by one of these perforations 112, atmospheric air will be admitted to the chamber 108, raising the valve 105 and connecting the pneumatic 92 to the exhaust chamber 104. The pneumatic 92 will thus be deflated, positioning the sliding valve 80 to open the tube 78 leading to the smaller pneumatic of the base regulator R', thus causing a partial reduction of the tension in the bass portion of the action chest A, and giving a medium loud or *mf* expression to the bass notes. It will be understood that the action chest A is divided into bass and treble sections. Similar tracker openings 111ª and 111ᵇ (Fig. 10) are connected by tubes 110ª and 110ᵇ (Figs. 1 and 15) to the pneumatics 90 and 91 respectively, and when uncovered give full pressure or extreme reduced pressure in the bass regulator R'.

Additional special tracker openings 120 (Fig. 10) are connected by pipes 121 (Fig. 1) to the pneumatics 95 (Fig. 15) which control the treble regulator R, the operation being precisely similar to that above described.

Provision is made for controlling the expression regulators R and R' manually, and I will now describe the hand shift mechanism H shown in detail in Figs. 6 to 9. The mechanism H comprises a valve block 130 (Fig. 8) with which the tubes 77 and 78 (Fig. 1) are connected by branch tubes 770 and 780 leading to openings 771 and 781 (Fig. 8) in the valve seat. The tubes 60, 61 and 62 are similarly connected by branch tubes 600, 610 and 620 to openings 601, 611 and 621 also positioned in the valve seat and paired with the openings 771 and 781.

A valve 131 is slidable in the valve block 130 and is provided with two air passages 132 and 133, the passage 132 being in line with the openings 771 and 781, and the passage 133 being in line with the openings 601, 611 and 621. When the valve is in the position shown in Figs. 6 and 7 the branch tubes are all closed and the hand shift mechanism is inoperative. As the slide valve is moved to the right it successively uncovers the openings 621 and 781, the openings 611 and 771, and the openings 601 and 771, the latter opening being elongated so as to be operative with either the opening 601 or 611. In each operative position of the valve it therefore controls the operation of one pneumatic in each of the regulators R and R'. The valve is actuated through a valve rod 134 adjustably connected by a link 135 to a hand shift lever 136.

The hand shift mechanism H may be used in conjunction with the automatic control, but it is more commonly used separately, and under such circumstances it is desirable to cut out the automatic control when the hand shift mechanism is in use. For this purpose I provide the cut-out mechanism shown in detail in Figs. 2 to 5 inclusive.

This mechanism comprises a valve block 140 (Fig. 3) having passages 141 and 142 formed therein. The passage 141 is connected by a tube 143 to the wind trunk W through the high pressure exhaust chamber of the regulator R' and the passage 142 is connected by a pipe 144 to the exhaust chamber 104 of the selectors G and G'.

A pneumatic 145 is mounted on the block 140 and the air chamber of the pneumatic is connected with both the passages 141 and 142. The movable leaf of the pneumatic 145 is extended at 146 and is provided with a depending lug 147 adapted to engage a cam 148 mounted on a pin 149 having a bearing in the side of the spool box S, and provided at its inner end with a handle 150 (Fig. 5). By swinging the handle 150 downward, the cam 148 will open the pneumatic 145, thus rendering the selectors G and G' operative. If the handle 150 is raised, the cam will allow the pneumatic to close, and a packing 151 (Fig. 3) will cover the opening 141, thus cutting out the automatic selector.

Whenever either the automatic selector or the hand shift mechanism is thrown in operation, it is essential, to prevent interference, that the other device should be set in inoperative position, and I control this setting of the devices in inoperative position from the pneumatic 145. For controlling the selectors I provide a block 160 (Figs. 3 and 4) having passages 161 and 162 formed therein and connected by pipes 163 and 164 with passages 165 and 166 formed in the base of the selectors G and G'. The passage 165 is connected with the air chamber or recess underlying the diaphragm which controls the air valve of the pneumatic 90 which renders the valve 80 inoperative, while the passage 166 is similarly connected to control the pneumatic 95 which moves the treble selector valve to inoperative position.

The passages 161 and 162 in the block 160 are positioned to be covered by a plate 167 secured to the extension 146 of the pneumatic 145 when raised by the cam 148, the selector being then in operation. Whenever the selector is rendered inoperative by the movement of the cam 148 to the position shown in Fig. 4, the passages 161 and 162 are each left open to the atmosphere and the pneumatics 90 and 95, above mentioned, are thus rendered operative to move the selector valves to inoperative position.

For moving the hand shift valve 131 to inoperative position when the selectors are in use I provide a pneumatic 170 (Figs. 1 and 6) the movable leaf of which engages a collar 171 on a rod 172 connected to the hand shift lever 136. The pneumatic 170 is connected by a tube 173 to an opening 174 opening into the passage 142 (Fig. 3) in the block 140. When the pneumatic 145 is raised, the tube 173 is connected through the pneumatic to the exhaust of the instrument and deflates the pneumatic 170, thus moving the slide valve 131 to the inoperative position shown in Fig. 6.

The operation of my improved expression mechanism has been described in connection with the description of the different component parts of the mechanism, and it is not thought necessary to further describe the operation.

Having thus described my invention it will be evident that changes and modifications can be made therein by those skilled in the art without departing from the spirit and scope of my invention as set forth in the claims, and I do not wish to be otherwise limited to the details herein disclosed, but what I claim is:—

1. In an automatic musical instrument, in combination, means to produce air tension, a tension regulating device having a valve therein, a plurality of expression pneumatics each effective to separately actuate and position said valve, and a sheet-controlled selector effective to render any selected expression pneumatic separately operative to definitely position said tension regulating valve and to simultaneously render the remaining expression pneumatics inoperative.

2. In an automatic musical instrument, in combination, means to produce air tension, a tension regulator, a selector effective to automatically control the operation of said regulator, manual means for controlling said regulator, and means effective to render either controlling means inoperative when the other controlling means is rendered operative.

3. In an automatic musical instrument, in combination, means to produce air tension, a tension regulator, a selector effective to automatically control the operation of said regulator, manual means for controlling said regulator, manual means effective to render said automatic selector operative or inoperative, and means to render said manual control inoperative when the automatic control is rendered operative.

4. In an automatic musical instrument, in combination, means to produce air tension, a tension regulator, a selector effective to automatically control the operation of said regulator, manual means for controlling said regulator, manual means effective to render said automatic selector operative or inoperative, and pneumatic connections between said last-named means and said manual control through which the manual control will be rendered inoperative when the automatic control is rendered operative.

5. In an automatic musical instrument, in combination, exhaust mechanism, a pressure regulator, an air chamber in which the tension is normally controlled by said regulator, expression-changing devices for said regulator, means to selectively render said devices operative, and a relief valve positioned for engagement by said regulator as the latter approaches its closed position, by which engagement said relief valve is opened to admit air to said chamber to further reduce the air tension therein, thereby causing an opening movement of said regulator.

6. In an automatic musical instrument, in combination, exhaust mechanism, a pressure regulator, an air chamber in which the tension is normally controlled by said regulator, a relief port directly connected to said chamber, a relief valve for said port, and connections whereby said valve is opened by said regulator as the latter approaches its closed position, thereby admitting air to said chamber.

7. In an automatic musical instrument, in combination, means to produce air tension, a tension controlling valve, a plurality of expression pneumatics each effective to separately modify the action of said controlling valve, a second valve effective in different positions to render a selected expression pneumatic only operative, and the other expression pneumatics simultaneously inoperative, and a sheet controlled selector for positioning said second valve.

8. In an automatic musical instrument, in combination, means to produce air tension, a tension regulating valve, and a plurality of pneumatics adapted to be separately exhausted but all movable as a unit to position said valve, one of said pneumatics being provided with a relief valve permitting escape of air therefrom when any other pneumatic is exhausted.

In testimony whereof I have hereunto affixed my signature.

THOMAS DANQUARD.

Witnesses:
WILLIAM J. KEELEY,
WILLIAM J. SARTOR.